(12) United States Patent
Doi et al.

(10) Patent No.: US 8,799,541 B2
(45) Date of Patent: Aug. 5, 2014

(54) TRANSMITTER, RECEIVER, AND COMMUNICATION PATH SWITCH METHOD

(71) Applicant: Kabushiki Kaisha Toshiba, Tokyo (JP)

(72) Inventors: Takashi Doi, Fuchu (JP); Nobuaki Suzuki, Akishima (JP); Masahiko Mawatari, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/711,080

(22) Filed: Dec. 11, 2012

(65) Prior Publication Data

US 2013/0162903 A1    Jun. 27, 2013

(30) Foreign Application Priority Data

Dec. 27, 2011    (JP) ................... 2011-286271

(51) Int. Cl.
| G06F 3/00 | (2006.01) |
| G06F 13/12 | (2006.01) |
| G06F 3/14 | (2006.01) |
| H04N 21/4363 | (2011.01) |

(52) U.S. Cl.
CPC ............ *G06F 3/14* (2013.01); *H04N 21/43635* (2013.01)
USPC .............................................. 710/62; 710/61

(58) Field of Classification Search
None
See application file for complete search history.

(56) References Cited

U.S. PATENT DOCUMENTS

| 8,000,355 | B2 | 8/2011 | Ichimura et al. |
| 8,260,955 | B2 | 9/2012 | Ichimura et al. |
| 2010/0128182 | A1 | 5/2010 | Ichimura et al. |
| 2010/0132004 | A1 | 5/2010 | Ota et al. |
| 2010/0232522 | A1 | 9/2010 | Ichimura et al. |
| 2010/0259691 | A1 | 10/2010 | Sasazaki |
| 2010/0290539 | A1 | 11/2010 | Ichimura et al. |
| 2010/0290540 | A1 | 11/2010 | Ichimura et al. |
| 2010/0290541 | A1 | 11/2010 | Ichimura et al. |

FOREIGN PATENT DOCUMENTS

| JP | 2009-130606 A | 6/2009 |
| JP | 2009-294797 A | 12/2009 |
| JP | 2010-246057 A | 10/2010 |

*Primary Examiner* — Idriss N Alrobaye
*Assistant Examiner* — Richard B Franklin
(74) *Attorney, Agent, or Firm* — Knobbe, Martens, Olson & Bear LLP

(57) ABSTRACT

According to one embodiment, a transmitter including an AV transmission unit including a first transmission unit which transmits video/audio data according to a method 1, and a second transmission unit which transmits video/audio data according to a method 2, with a clock signal inserted in a data signal, and a communication unit which performs the information communication with the receiver by a predetermined standard signal, a communication channel switch unit which transfers a video clock signal to a clock terminal of an HDMI if the video/audio data is transmitted by the first transmission unit, or transfers a first predetermined standard signal output from the communication unit if the video/audio data is transmitted by the second transmission unit, while the communication channel switch unit transfers a second predetermined standard signal received by an HPD/RSV terminal of the HDMI even in transmission by any of the first and second transmission units.

14 Claims, 9 Drawing Sheets

FIG. 1 -- Prior Art --

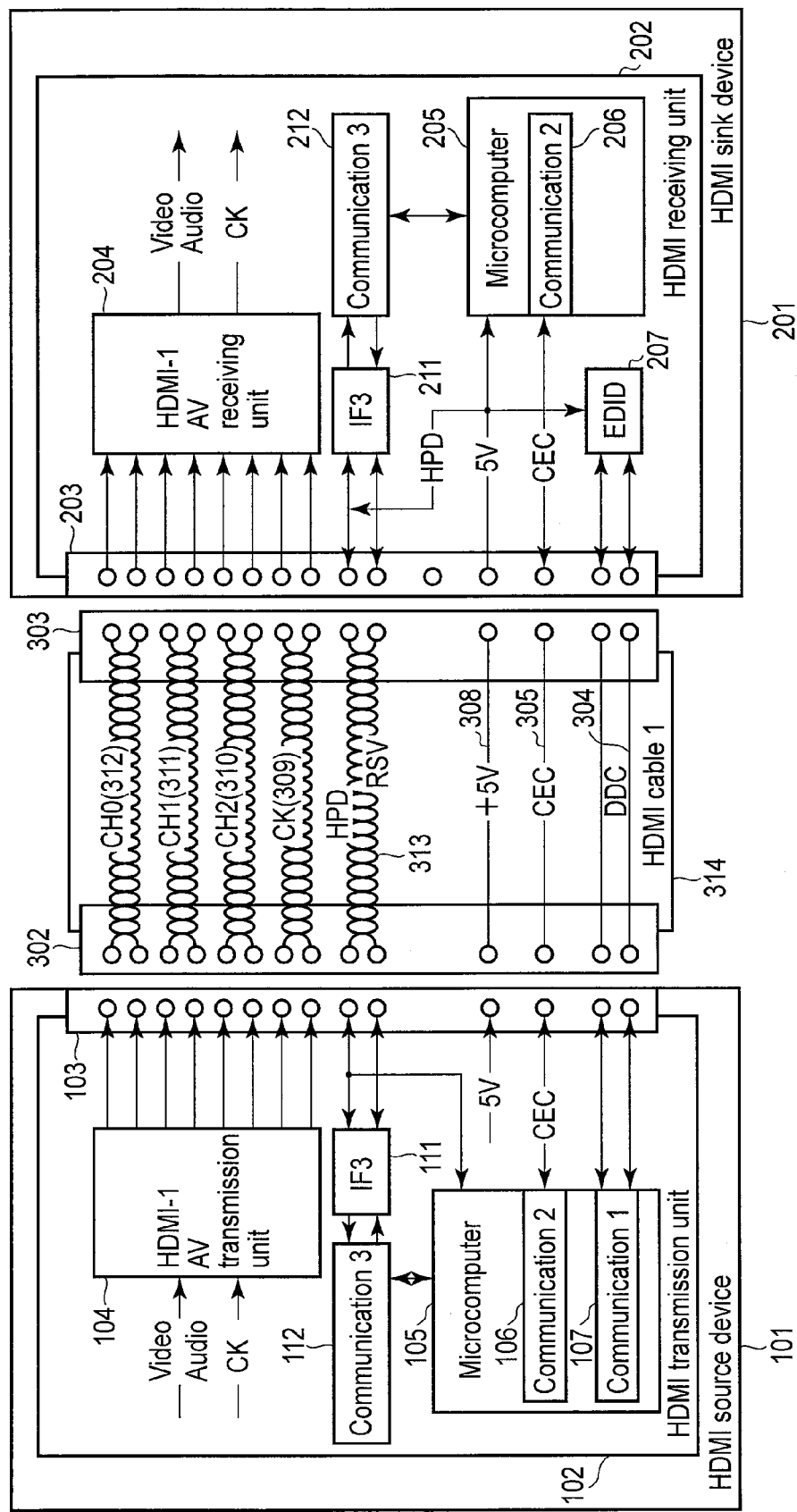
F I G. 2
-- Prior Art --

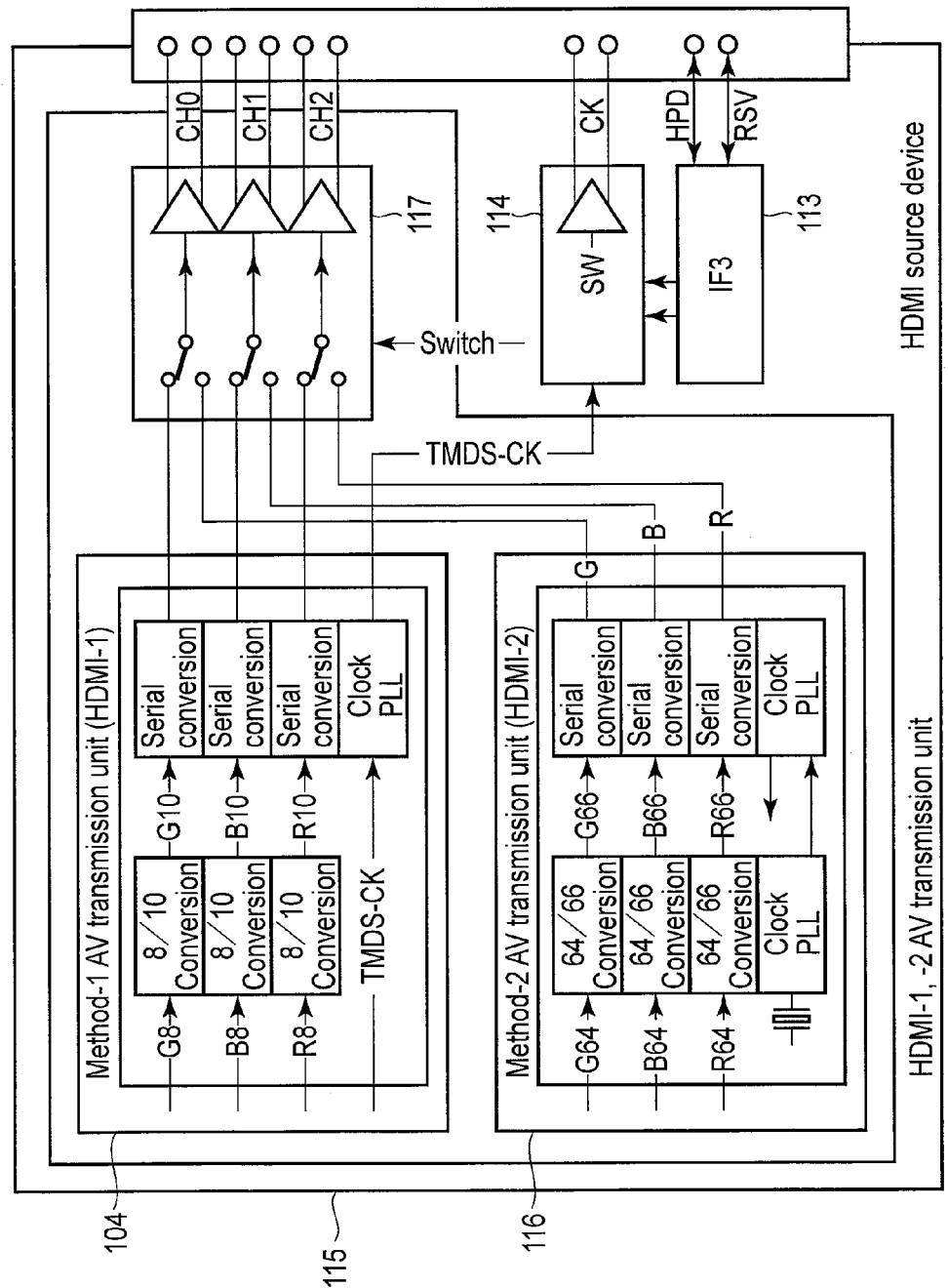
F I G. 4

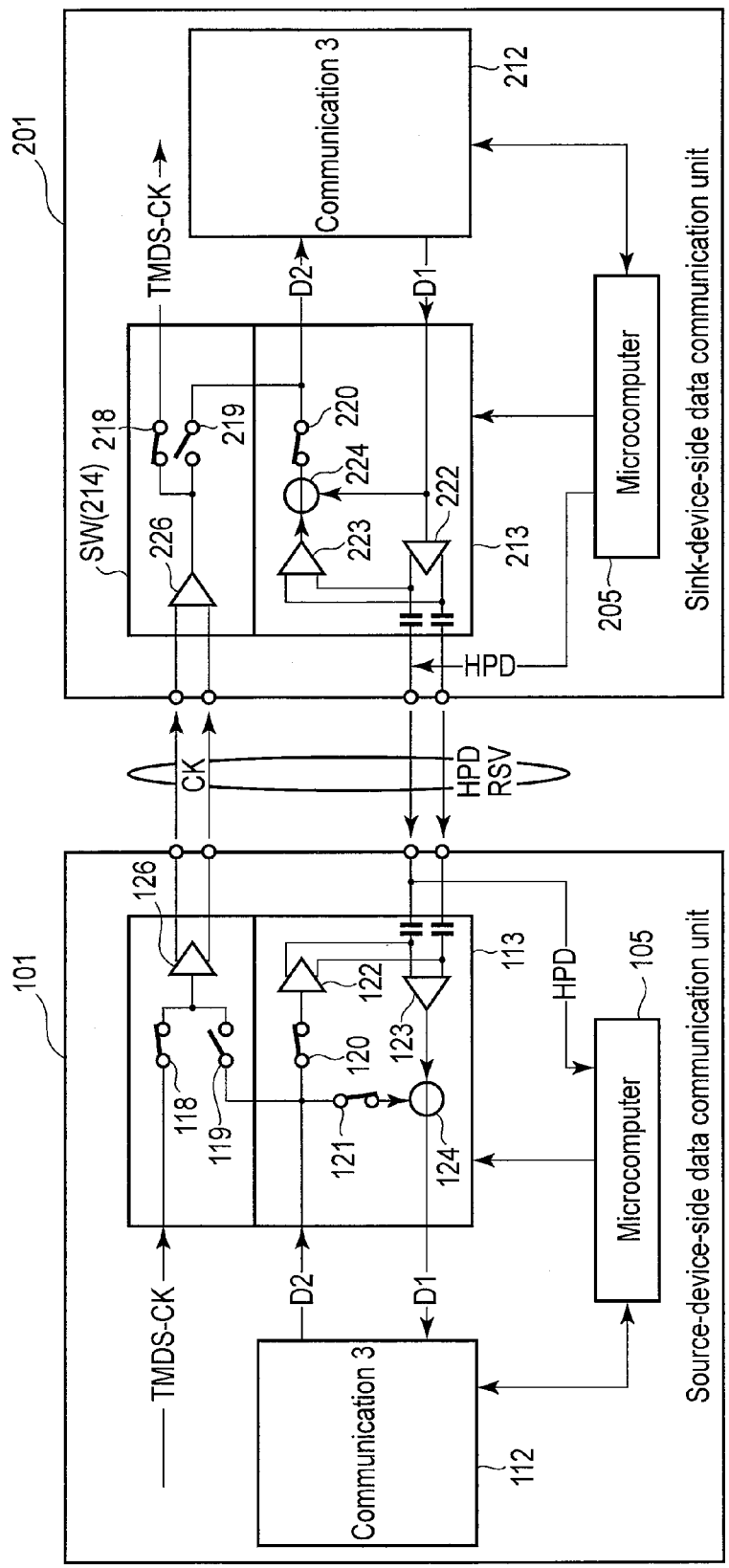
F I G. 5

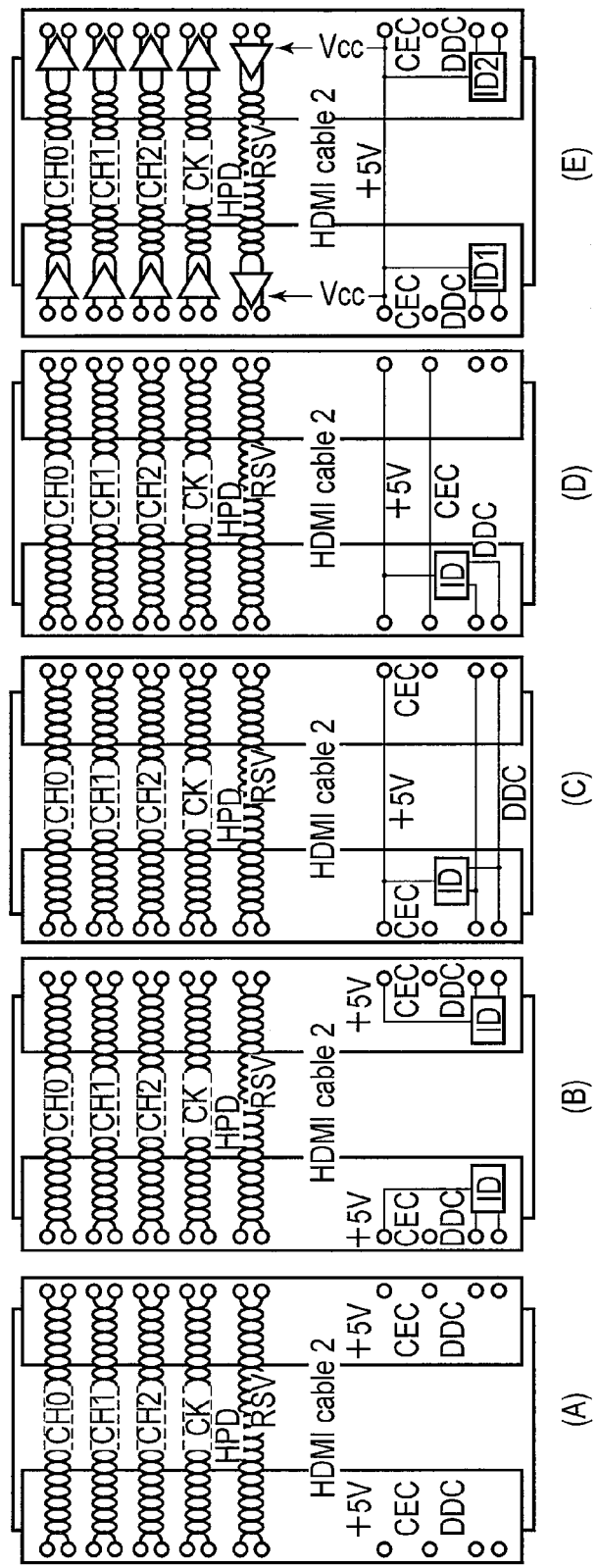
F I G. 6

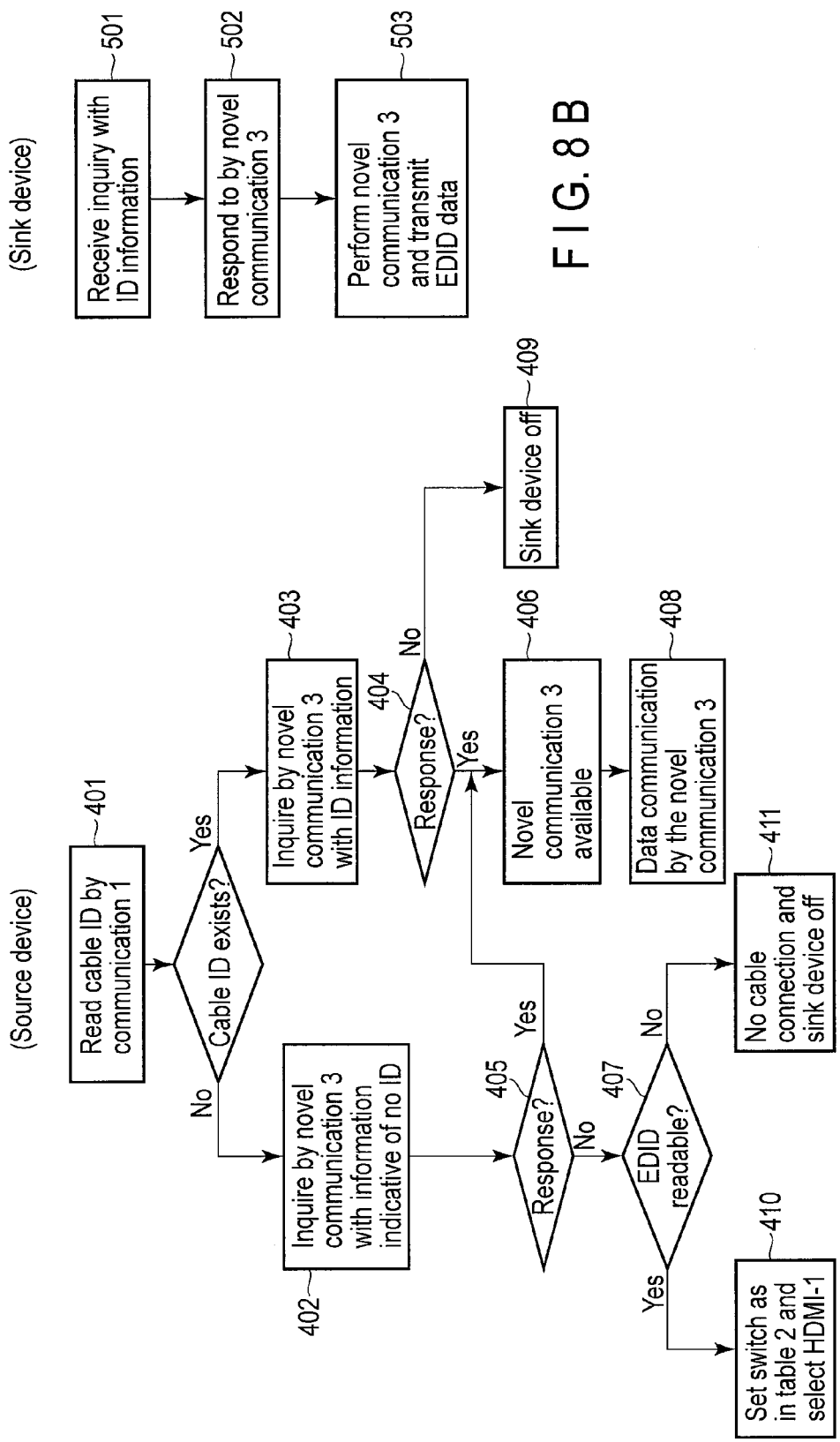
F I G. 8 A
F I G. 8 B

TRANSMITTER, RECEIVER, AND COMMUNICATION PATH SWITCH METHOD

CROSS-REFERENCE TO RELATED APPLICATIONS

This application is based upon and claims the benefit of priority from prior Japanese Patent Application No. 2011-286271, filed Dec. 27, 2011, the entire contents of which are incorporated herein by reference.

FIELD

Embodiments described herein relate generally to a transmitter, a receiver, and communication channel switch method.

BACKGROUND

A High-definition Digital Media Interface (HDMI) cable and an optical fiber cable are widely used as bidirectional communication interface devices.

For connection using HDMI, HDMI Audio Return Channel version 1.4 (HDMI-ARC) improved in transfer of audio signals, and HDMI Ethernet Channel (HDC) version 1.4 capable of exchanging control signals over Ethernet (registered trademark) have been established.

In accordance with demands for a faster transfer speed or for a longer transfer distance, a cable capable of high-speed communication like 10-Gigabit Ethernet (10 GbE) conforming to the Institute of Electrical and Electronics Engineers (IEEE) 802.3ae standard has already been put into practice for unidirectional communication only.

Further, there has been disclosed a method for introducing bidirectional Ethernet communication into an HDMI system by forming a single communication channel.

Aiming for high-speed long-distance transfer, an HDMI cable has been proposed which includes a waveform equalizer using an active element and has signal lines each being single-directional. A cable as described is adequate for an optical transfer cable. When each of signal transfer directions in a cable is limited to a single direction, a conventional system has difficulties in maintaining compatibility with devices of early models.

An embodiment is directed to providing a signal transfer system which is capable of using a multi-core cable including signal lines each having a single transfer direction and is also capable of improving compatibility with conventional devices.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 shows a schematic configuration of an HDMI system in which a further function is added to the system shown in FIG. 1 (version 1.4 or higher);

FIG. 4 is a block diagram showing a detailed configuration of HDMI-1, -2 AV transmission unit 115 in FIG. 3;

FIG. 5 is a detailed block diagram showing SW/IF4 113 and 213 which interface communication 3 shown in FIG. 3;

FIG. 6 shows configurations of various novel cables;

FIGS. 8A and 8B show flowcharts showing communication operations of making an inquiry from a source device to a sink device and a response thereto.

DETAILED DESCRIPTION

Various embodiments will be described hereinafter with reference to the accompanying drawings. In general, according to one embodiment, there is provided a transmitter which performs information communication information with a receiver 201 and transmits video/audio data to the receiver 201, the transmitter comprising: an AV transmission unit comprising a first transmission unit which transmits video/audio data according to a method 1, and a second transmission unit which transmits video/audio data according to a method 2 with a clock signal inserted in a data signal; a communication unit which performs the information communication with the receiver by a predetermined standard signal; a communication channel switch unit which transfers a video clock signal to a clock terminal of HDMI if the video/audio data is transmitted by the first transmission unit, or transfers a first predetermined standard signal output from the communication unit if the video/audio data is transmitted by the second transmission unit, while the communication channel switch unit transfers a second predetermined standard signal received by an HPD/RSV terminal of HDMI even in transmission by any of the first and second transmission units; and a controller which controls the AV transmission unit and the communication channel switch unit.

Figure 1:
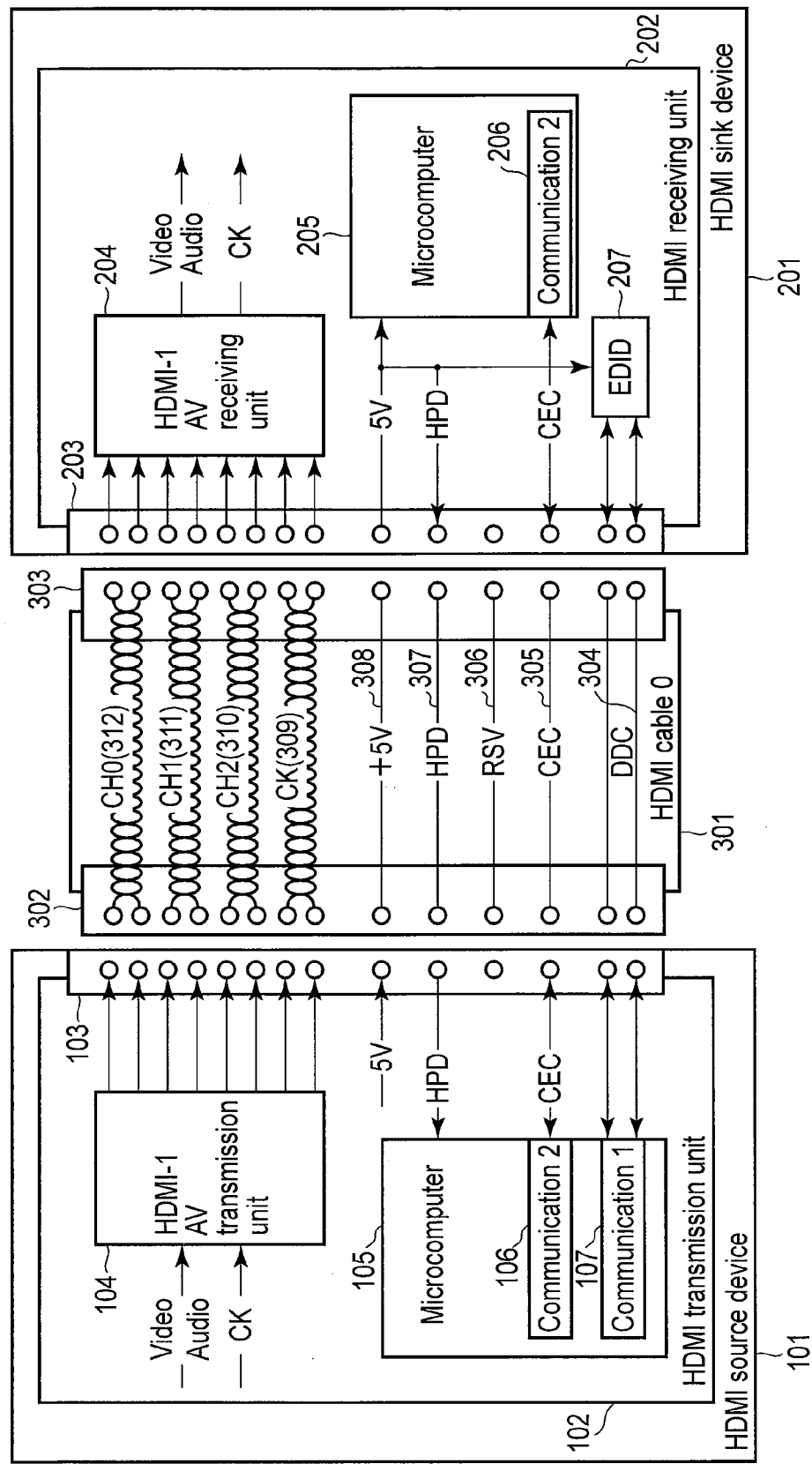
FIG. 1 shows a schematic configuration of an early HDMI system (version 1.0 to 1.3)

Hereinafter, a transmitter and a receiver according to embodiments will be described with reference to the drawings. FIG. 1 shows a schematic configuration of an early high-definition-digital media interface (HDMI) system (version 1.0 to 1.3). An HDMI source device 101 and an HDMI sink device 201 are connected through an HDMI cable 0_301. The HDMI source device 101 comprises a transmission unit 102, which comprises an HDMI-1 AV transmission unit 104 and a microcomputer 105. The transmission unit 104 and microcomputer 105 each are connected to an HDMI terminal 103 through signal lines.

An HDMI sink device 201 comprises an HDMI receiving unit 202 which further comprises an HDMI-1 AV receiving unit 204, a microcomputer 205, and extended display identification data (EDID) memory 207. The EDID memory 207 records coded display properties/abilities of the HDMI sink device.

The source device 101 comprises a recording device which records and/or reproduces, for example, video signals and audio signals of contents, i.e., broadcast programs, a player device which can only reproduce contents, a game device, or a video camera. The source device 101 can alternatively be a personal computer (PC) or may be, for example, a data reproduction device (optical disc drive device) which reproduces data (content) stored on an optical disc according to DVD/CD standards, such as a reader/writer (data reproduction device) capable of reading data (contents) from a solid-state drive (SSD [a semiconductor memory device]), a mobile terminal device, a digital photo camera, or a mobile phone comprising a memory device like a SSD, or a navigation device which can be mounted on a car or carried with by a user.

The sink device 201 comprises, for example, a television receiver which reproduces video signals and audio signals, or a monitor device (display) which displays video signals and a loudspeaker (and an audio amplifier) which reproduces voice or audio signals.

The HDMI cable 0_301 includes first to third channels CH0, CH1, and CH2 and a clock line CK each of which is formed as a twisted-pair line, a 5V power line, a hot-plug-detected (HPD) line, a reserve (RSV) line, a Consumer Electronics Control (CEC) line, and dual display data channel (DDC) lines each of which is formed as a single line.

The first to third channels CH0, CH1, and CH2 respectively correspond to color components green (G), blue (B), and red (R) of an image signal. Audio data and control data are transmitted to the sink device 201 through the channels CH0, CH1, and CH2 in a horizontal retrace period or a vertical retrace period. A clock signal for capturing data signals through the channels CH0, CH1, and CH2 is transferred through the clock channel 309. Per one clock transferred through the clock channel 309, pixel data of, for example, 10 bits is transmitted.

The HPD line conforms to existing HDMI standards, and is a signal line used for detecting a partner device to connect to. Further, the RSV line is prepared according to a standard 1 to which the HDMI cable 0-301 conforms, for example, as an extension in view of use as a bidirectional communication channel.

The microcomputer 105 provided in the HDMI transmission unit 102 of the HDMI source device 101 includes a communication unit 107 (hereinafter, a communication-1 unit 107) having a function for communication 1 and a communication unit 106 (hereinafter, a communication-2 unit 106) having a function for communication 2. The communication-1 unit 107 has a function to read data recorded on an EDID memory 207 of the sink device 201 through a DDC line. This data of EDID describes display performance information of the display device (not shown) which the sink device 201 includes.

The communication-2 unit 106 establishes CEC communication with the communication unit 206 (hereinafter referred to as a communication-2 unit 206) which has a function of communication 2 and is provided in the microcomputer 205 in the sink device 201, through the CEC line 306 in the cable 0301. The CEC refers to a signal corresponding to information transmitted from a remote controller used to operate the source device 101 and sink device 201. The communication 2 is made at a communication speed of approximately 10 kbps.

FIG. 2 shows a schematic configuration of an HDMI system (version 1.4 or higher) configured by adding another function to the system of FIG. 1.

Like in the configuration of FIG. 1, the HDMI source device 101 and the HDMI sink device 201 are connected through an HDMI cable 1_314. The same components as shown in FIG. 1 are denoted at the same reference symbols, and detailed descriptions thereof will be omitted.

The HDMI source device 101 is newly added with a communication unit 112 (hereinafter, a communication-3 unit 112) having a function of communication 3 and an interface IF3 111. The HDMI sink device is also newly added with a communication unit 212 (hereinafter, a communication-3 unit 212) having a function of communication 3 and an interface IF3 211. In the HDMI cable 1-314, the RSV line 306 and the HPD line 307 which is depicted in FIG. 1 and not used are configured as a twisted-pair line 313.

The communication-3 units 112 and 212 perform data communication, like the communication-2 units 106 and 206, at a higher speed than that of the latter units. The communication-3 units 112 and 212 transfer an HPD signal and also transfer a variety of information by communication under a predetermined standard, for example, the Ethernet communication.

Next, a transmitter and a receiver according to an embodiment will be described.

Figure 3:
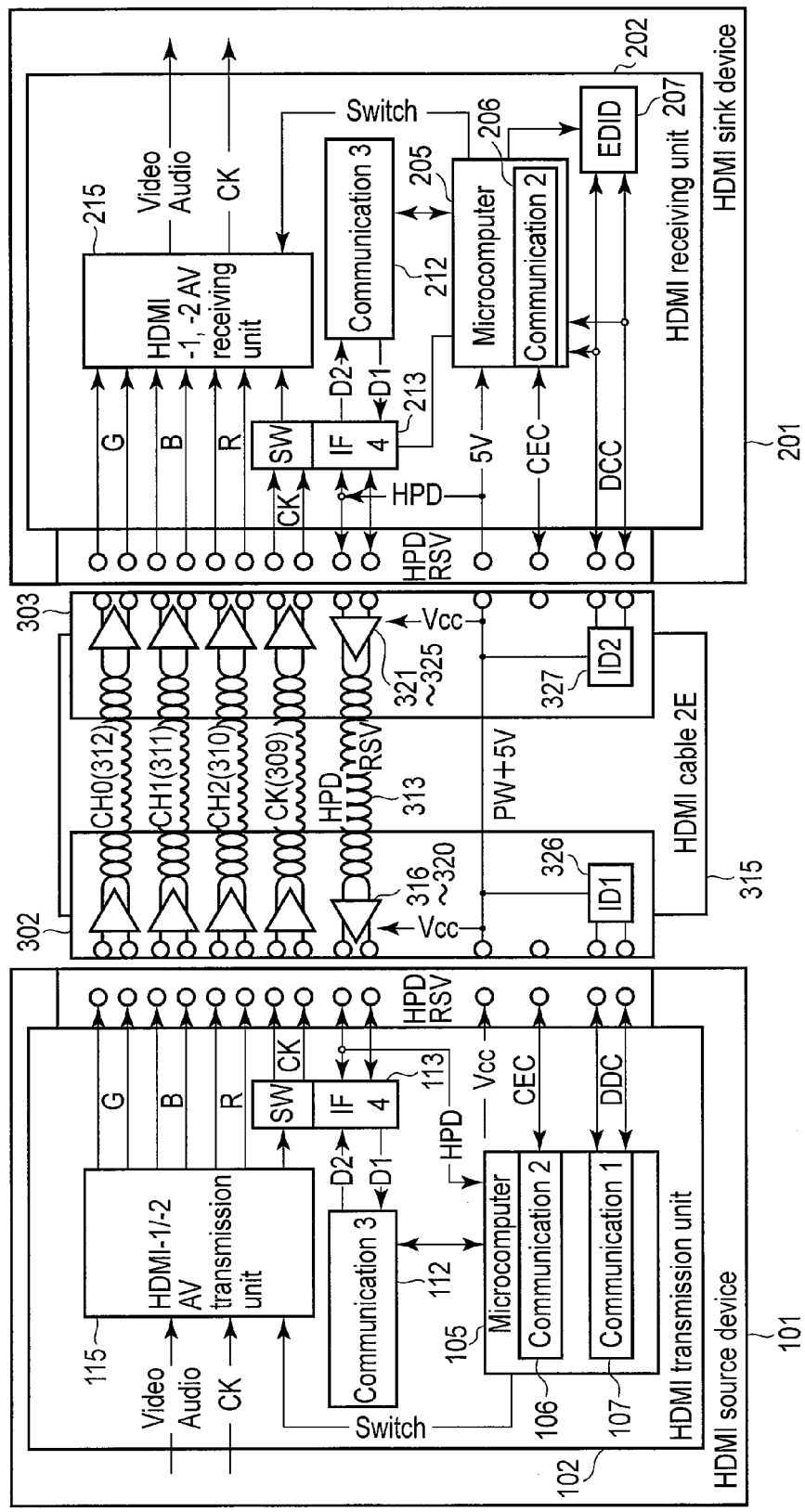
FIG. 3 shows a schematic configuration of an HDMI system configured as an AV apparatus according to an embodiment.

FIG. 3 shows a schematic configuration of an HDMI system configured by a transmitter and a receiver, according to an embodiment. The configuration of the HDMI system has distinctive features compared with the configuration in FIG. 2.

Firstly in a source device 101, a block of SW/IF 4 113 configured by extending the conventional IF3 111 shown in FIG. 2 is provided between a communication-3 unit 112 and an HDMI terminal. The HDMI-1 AV transmission unit 104 shown in FIG. 2 is substituted with HDMI-1, -2 AV transmission unit 115. A control line for switching the two of HDMI-1 and HDMI-2 is connected to the transmission unit 115 from a microcomputer 105.

The HDMI-1 employs a method of performing data processing by using a conventional TMDS encoder and will now be referred to as a method 1. HDMI-2 is a method of performing data processing by using an encoder conforming to, for example, IEEE 802.3ae, and will now be referred to as a method 2. When data is transferred according to the method 2, a clock is embedded in the data, and the receiving side reproduces the clock while receiving data. Therefore, when data is transferred according to the method 2, there is no need to use any special clock line dedicated to transfer of a clock from a source device to a sink device.

As a second feature, in a sink device 201, a block of SW/IF4 213 configured by extending the conventional IF3 211 shown in FIG. 2 is provided between a communication-3 unit 212 and an HDMI terminal. The HDMI-1 AV transmission unit shown in FIG. 2 is substituted with an HDMI-1, -2 AV transmission unit 215. A control line for switching the two of HDMI-1 and HDMI-2 is connected to the transmission unit 215 from a microcomputer 205.

As a third feature, in a cable 2E 315, mono-directional amplifiers 316 to 320 and 321 to 325 are connected to terminals of CH0, CH1, CH2, CK, and HPD/RSV of HDMI terminals at two ends of the cable, and the corresponding amplifiers at the ends of the cable are connected to each other by twisted pair lines 309-313. These mono-directional amplifiers 316 to 325 each are formed by a differential amplifier. The amplifiers 316 to 325 are supplied with power from a power line VCC.

To DDC terminals of the cable 2E 315, memories ID1-326 and ID2 327 are connected, which store coded cable properties readable like an EDID. The memories ID1 326 and ID2 327 are also supplied with power from the power line VCC.

As a fourth feature, the conventional communication-3 unit 112 shown in FIG. 2 is directly used but for an additional correction of providing blocks of SW/IF4 113 and 213 which enable a clock line 309 for communication (HDMI-1) to be available. A further feature is that a communication direction of the HPD/RSV line is opposite to a transfer direction of video and audio signals.

Thus, in the present embodiment, a mono-directional communication channel is configured from the source device through the CK line to the sink device, and another mono-directional communication channel is configured from the sink device through the HPD/RSV line to the source device. The same communication as conventional communication is made by the conventional communication 3.

EDID information and a CEC signal are transferred as a signal of a predetermined standard (for example, Ethernet) to the source device 101 through SW/IF4 113 and the HPD/RSV line under control of the microcomputer 205. The HDMI-1, -2 AV transmission unit 115, HDMI-1, -2 AV receiving unit 215, communication-1 unit 107, communication-2 units 106 and 206, and communication-3 units 112 and 212 may be practiced in form of hardware or software by using a microcomputer (a processing device or a CPU).

FIG. 4 is a block diagram showing a detailed configuration of HDMI-1, -2 AV transmission unit 115 shown in FIG. 3.

The method-1 AV transmission unit 104 (HDMI-1) is a conventional TMDS encoder as described above. The method-2 AV transmission unit (HDMI-2) 116 is an encoder which conforms to IEEE 802.3ae. A clock for data transfer is embedded in data.

The method-1 AV transmission unit (HDMI-1) 104 converts, into 10-bit signals, signals G, B, and R which are respectively 8-bit video signals and are multiplexed with an audio signal, and further converts the 10-bit signals each into serial data. The converted serial data is transmitted as CH0 to CH2 signals through a switch unit 117. For the 8/10 conversion, a clock PLL which inputs a TMDS clock (TMDS-CK) generates a clock having a ten times higher frequency than a TMDS clock frequency.

The method-2 AV transmission unit (HDMI-1) 116 converts packeted video signals G, B, and R into 66-bit signals in units of 64 bits, and then converts the 66-bit signals each into serial data. The converted serial data is transmitted as CH0 to CH2 signals through the switch unit 117.

Referring back to FIG. 3, various types of cables are available as a cable which connects the source device 101 and the sink device 201, and conventional cables are also available. A device as a partner to connect may be any conventional device. The configuration as described previously is the same as that of the conventional HDMI except the SW/IF4 113 and 213 in both the source and sink sides.

Thus, in the present embodiment, a mono-directional communication channel is configured from the source device through the CK line to the sink device, and another mono-directional communication channel is configured from the sink device through the HPD/RSV line to the source device. This configuration performs the same communication as conventional communication by the conventional communication 3, and also performs data transfer according to HDMI-1 and HDMI-2. Of course, the configuration of FIG. 3 is compatible with other novel cables which are not single-directional and with conventional cables as well. The configuration of the source and sink devices according to the present embodiment is particularly adequate for single-directional HDMI cables (including optical cables).

As will be described later, a further feature of the present embodiment is to determine whether a partner device maintains any novel function or not and whether a novel cable or a conventional cable is used.

FIG. 5 is a detailed circuit diagram showing the SW/IF4 113 and 213 which interface the communication 3 shown in FIG. 3. The SW/IF4 113 includes switches 118 to 121, differential amplifiers 123, 122, and 126, and a subtractor 124. The switches 118 to 121 are controlled by the microcomputer 105. The SW/IF4 213 includes switches 218 to 220, differential amplifiers 222, 223, and 226, and a subtractor 224. The switches 218 to 220 are controlled by the microcomputer 105.

Since presence or absence of a cable ID and content thereof can be detected by the source device side, whether a connected cable is a novel cable including a single-directional cable or not can be determined. For a novel cable, the microcomputer 105 switches the switches as shown in Table 1 and communicates by the communication 3.

TABLE 1

| New cable (FIG. 6 described later) | | | | | | |
|---|---|---|---|---|---|---|
| Source side: switches at SW/IF 4 | | | | Sink side: switches at SW/IF 4 | | |
| 118 | 119 | 118 | 119 | 118 | 119 | 118 |
| OFF | ON | OFF | ON | OFF | ON | OFF |

Whether the conventional communication 3 shown in FIG. 2 or the communication 3 shown in FIG. 3 is used in the side of the source device is unknown at first from the side of the sink device. Therefore, the microcomputer 205 alternately turns on/off the switches 219 and 220, to thereby determine whether a carrier for the communication 3 (Ethernet) is received from a CK terminal or an RSV/HPD terminal by the communication-3 unit 212. If the carrier for the communication 3 is received from the CK terminal and/or RSV/HPD terminal, the microcomputer 205 sets the switches as shown in Table 1, and selects the method-2 receiving unit (HDMI-2), to thereby make audio/video data receivable. This determination can be made depending on an initial state just after a cable is connected and the power is turned on. If the carrier for the communication 3 is not received from any of the CK terminal and the RSV/HPD terminal or if a clock for AV data is input from the CK terminal, the microcomputer can determine the cable to be a conventional cable.

When the HDMI cable is the conventional cable as shown in FIG. 1 or 2, the switches 118, 120, and 121 on the source side are set on (by the microcomputer on the source side though wiring thereof is not shown), and the switch 119 is set off. The switches 218 and 220 on the sink side are set on (by the microcomputer on the sink side though wiring thereof is not shown), and the switch 219 is set off. TMDS-CK on the source side is transferred to the CK terminal on the sink side through the CK terminal. Data D1 and data D2 for the conventional communication 3 are transferred through the HPD/RSV line.

TABLE 2

| Conventional bidirectional cable (cable shown in FIG. 1 or 2) | | | | | | |
|---|---|---|---|---|---|---|
| Source side: switches at SW/IF 4 | | | | Sink side: switches at SW/IF 4 | | |
| 118 | 119 | 120 | 121 | 218 | 219 | 220 |
| ON | OFF | ON | ON | ON | OFF | ON |

If the HDMI cable is novel, the HDMI-2 AV transmission and receiving units shown in FIGS. 3 and 4 are selected, and the switches are switched as shown in Table 1. Data D2 (FIG. 3) from the source side is transferred to the sink side through the CK line, and data D1 from the Sink side is transferred to the source side through the HPD/RSV line.

From a different point of view, whether the conventional communication 3 in FIG. 2 or the novel communication 3 in FIG. 3 is to be performed needs to be determined at first. Since there are a variety of novel cables, the type of cable is determined first, and the type of communication is then determined. A processing of reading a cable ID or EDID through the DDC line is now supposed to be a first protocol. A processing of identifying a partner device by the Ethernet of the communication 3 is supposed to be a second protocol.

A variety of novel cables different from the conventional HDMI cables shown in FIGS. 1 and 2 will now be described. FIG. 6 shows configurations of the novel cables, and Table 3 show configurations and effects of the cables.

TABLE 3

Embodiments of Cables (descriptions marked "novel" in the novel/conventional column correspond to the present application)

| FIG. No. Sign | Novel/ conventional | Description of configuration | Effects |
|---|---|---|---|
| FIG. 1 | Conventional 1 | Cable configuration by early version of HDMI | |
| FIG. 2 | Conventional 2 | Cable configuration with HPD and RSV lines substituted with a twisted-pair line | |
| FIG. 6A | Novel | +5V, CEC, and DDC lines are removed from the cable of conventional 2 in FIG. 2. This configuration is a base. Optionally, CEC line is connected. | Minimum costs for cable |
| FIG. 6B | Novel | ID recording cable properties and options is provided compared with FIG. 6A. Optionally, CEC line is connected. | For example, transfer properties of cable are known from article of AV transfer band. Devices can transfer data in compliance with transfer properties. |
| FIG. 6C | Novel | ID is provided and DDC line is connected. | Source side can detect, by only first protocol, that partner is a novel device and is connected to novel cable. One ID is sufficient. |
| FIG. 6D | Novel | ID is provided and CEC is connected. | Source side can detect, by only first protocol, that partner is a novel device and is connected to novel cable. When connected reversely, second protocol is used. |
| FIG. 6E | Novel | Single-directional cable is provided with active elements on AV transfer channels, and is equivalent to cable in which twisted-pair line is formed of fiber cable. | Waveform equalization function is provided, and long-distance transfer with broadband property is available. Two IDs are arranged to differ from each other, and wrong connecting direction can be detected. |
| | Novel | Combination of foregoing configurations. Distinctive feature is that if no ID exists, neither CEC line nor DDC line exists, and that if DDC line and/or CEC line is connected, ID exists. If ID exists, connector has different shape. | Foregoing effects are obtained. |

Novel cables are all supposed to perform data transfer of HDMI-2. The followings are rules for identifying novel cables.

Rule 1: Novel cables have different connector shapes from conventional cables and cannot be connected to conventional source devices or sink devices.

Rule 2: Novel cables each basically have an ID.

Rule 3: In novel cables which have no ID, two ends of each of CEC and DDC lines are not connected.

Rule 4: Inversely, novel cables each are always provided with a cable ID whenever a CEC line and/or a DDC line is connected.

According to Rule 3 above, a cable which requires minimum costs is applicable. According to Rule 4, detection of a partner device and a cable is achieved by the first protocol only, although costs for the cable increase a little.

The CH0 to CH2, CK terminal, and twisted-pair line of HPD/RSV can perform high-speed communication like the conventional cable 1. Basically, no other line such as CEC line is connected for the purpose of cost reduction, and there are a number of variations in combinations of devices and cables. Table 4 shows for explaining examples of combinations of cables and source and sink devices. "Novel" if marked to a source device or a sink device implies that the device has an HDMI-1, -2 transmission unit or receiving unit. "Novel" if marked to a cable refers to any of FIGS. 6A to 6E. Novel A to E respectively denote cables shown in FIGS. 6A to 6E.

TABLE 4

Combinations of connection among cables and devices

| No. | Source device | Cable | Sink device | Connectability | Remarks |
|---|---|---|---|---|---|
| 1 | Conventional | Conventional | Conventional | Yes | Conventional connection |
| 2 | Conventional | Conventional | Novel | Yes | Conventional operation. No response to inquiry |
| 3 | Conventional | Novel | Conventional | No | Novel cables cannot be connected to conventional hardware |
| 4 | Conventional | Novel | Novel | No | |
| 5 | Conventional | Novel | Novel | No | |
| 6 | Novel | Conventional | Conventional | Yes | Conventional operation. No response to inquiry. |
| 7 | Novel | Conventional | Novel | Yes | Cable type is determined by protocol and replacement sign can be displayed. |
| 8 | Novel | Novel | Conventional | No | Novel cables cannot be connected to conventional hardware |

TABLE 4-continued

Combinations of connection among cables and devices

| No. | Source device | Cable | Sink device | Connectability | Remarks |
|---|---|---|---|---|---|
| 9 | Novel | Novel (A) | Novel | Yes | Hardware configuration (except connectors) is the same as conventional configuration of FIG. 2. Control data such as EDID data conforms with the novel protocol. |
| 10 | Novel | Novel (B) | Novel | Yes | If band of cable is broader than band of device according to protocol, indication can be displayed to ask replacement of cable. |
| 11 | Novel | Novel (C) | Novel | Yes | Source device can determine sink device cable by communication 1. |
| 12 | Novel | Novel (D) | Novel | Yes | Sink device can determine source device and cable by communication 2. |
| 13 | Novel | Novel (E) | Novel | Yes | Embodiment FIG. 3 |

Figure 7:
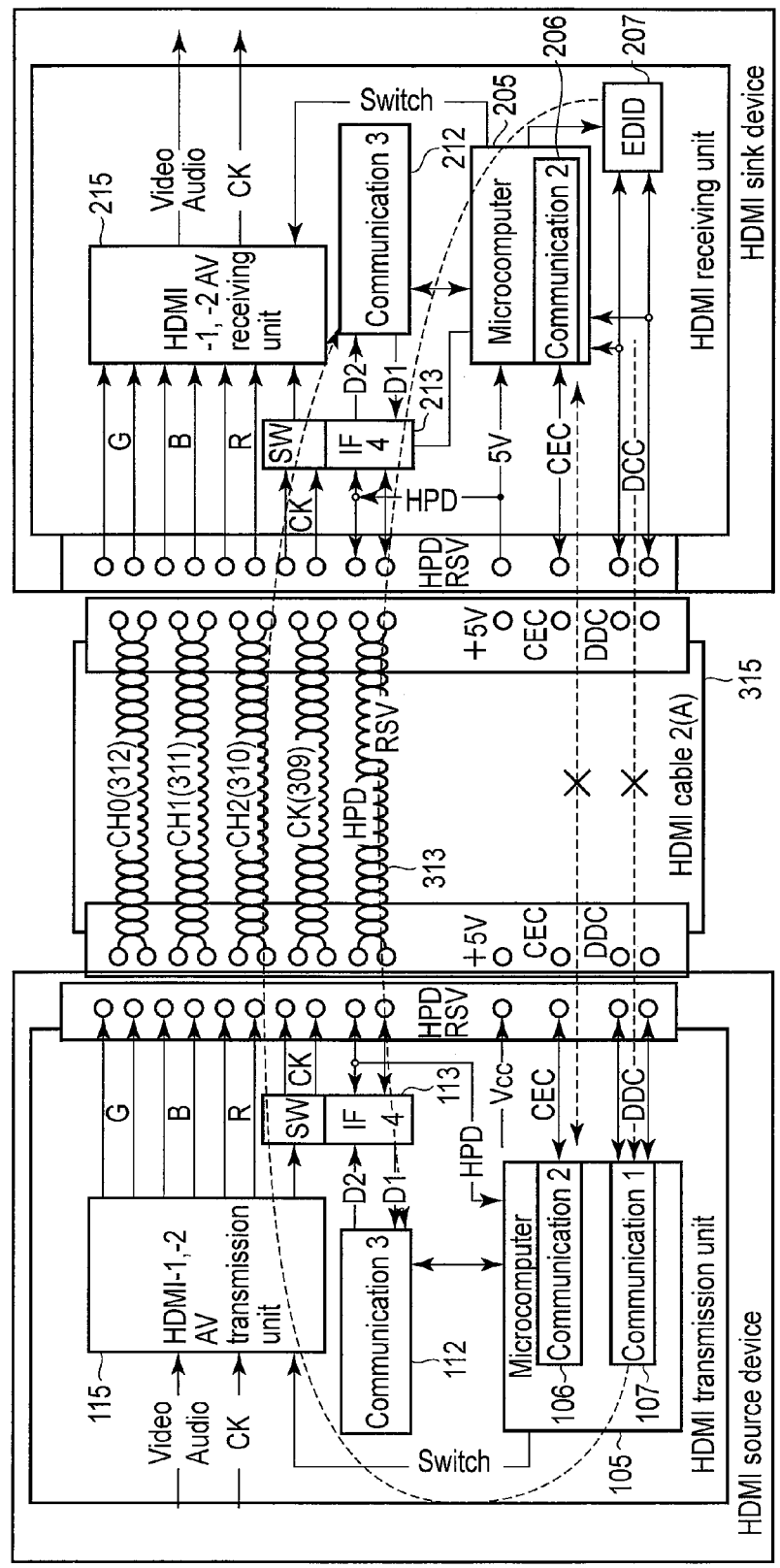
FIG. 7 shows a configuration for explaining flow of communication where a novel source device and a novel sink device are connected by a novel cable (A)

FIG. 7 shows signal paths (broken lines) when a novel source device and a novel sink device are connected by a novel cable (A) and each one of the devices identifies the cable and the other device. The novel cable (A) is configured by only five pairs of twisted-pair lines, and costs for the cable are therefore minimized.

FIG. 8 is a flowchart showing communication operation of making an inquiry from the source device to the sink device and a response thereto.

(A) Source Device

401: Reading of a cable ID is tried by communication by the communication 1 in the microcomputer 105 of the source device 101.

402: ID information of the cable cannot be received, and the source device 101 makes an inquiry to the sink device by the novel communication 3, adding information indicating no ID to an Ethernet signal (signal of a predetermined standard). In the novel communication 3, the switches are set as shown in Table 1, and the communication-3 unit 112 transfers EDID information and a CEC signal, as an Ethernet signal, from the sink device to the source device 101 through the HPD/RSV line. In the novel communication 3, the HDMI-2 is selected and AV data is transferred. Through the CK line, no HDMI-1 clock (TMDS clock) is transferred but the Ethernet signal is transferred.

403: ID information of the cable can be received, and the source device 101 makes an inquiry by the communication-3 unit 112, adding the ID information to the Ethernet signal. At this time, the source device 101 can determine that the connected cable is a novel cable as shown in any of FIGS. 6B to 6E.

(B) Sink Side

501: The sink device receives the inquiry in the foregoing step 402 or 403.

502: A response is made to the inquiry received in step 501.

503: The sink device can determine that the cable is a novel cable and that the source device in the partner side is a novel device. The sink device inserts EDID data into the Ethernet signal by the third transmission unit, and transmits the data to the source device. The sink device selects HDMI-2 receiving unit and allows reception of AV data.

(A) Source Side

404/405: The source side determines presence or absence of a response made in step 502. If a response is determined to have been made, the source device determines that the cable is a cable shown in FIG. 6A.

406: A response is determined to have been made. The source device determines that the sink device in the partner side is a novel device, and that transmission/reception of data by the novel communication 3 and AV data transmission by HDMI-2 are available.

408: CEC information is received from the sink device, i.e., data communication is made by the novel communication 3. The HDMI-2 transmission unit is selected, and transmission of AV data is enabled.

407: If no response has been made from the sink device, whether EDID is readable or not is determined by the communication 1.

410: If EDID is readable, the source device determines the cable and the sink device to be of conventional types, and sets switches as shown in Table 2. The method-1 AV-transmission unit (HDMI-1) is selected, and AV data is transmitted.

409/411: No response has been made from the sink device and/or EDID is unreadable. The source device determines no cable to be connected and/or stops communication with the sink device.

Figure 9B:
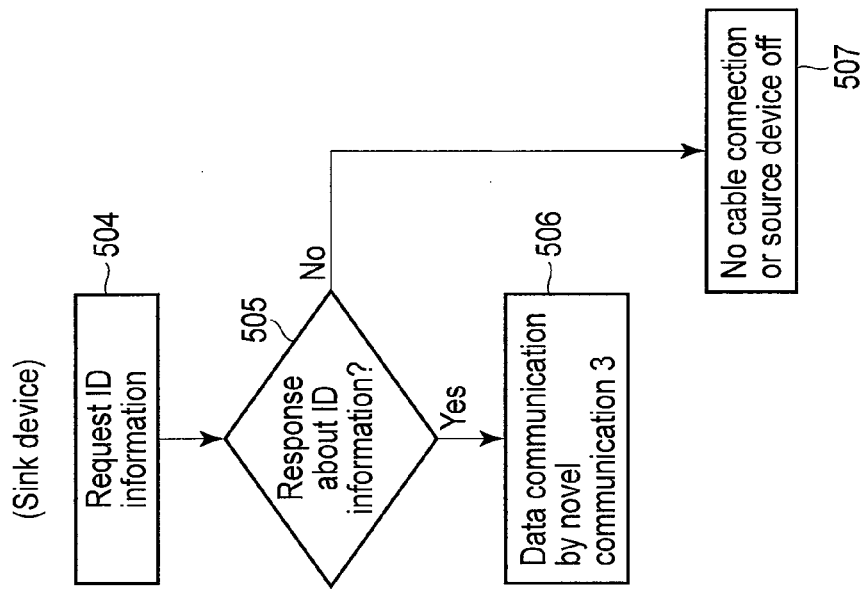
FIGS. 9A and 9B show flowcharts showing communication operations of making an inquiry from a sink device to a source device and a response thereto.
Figure 9A:
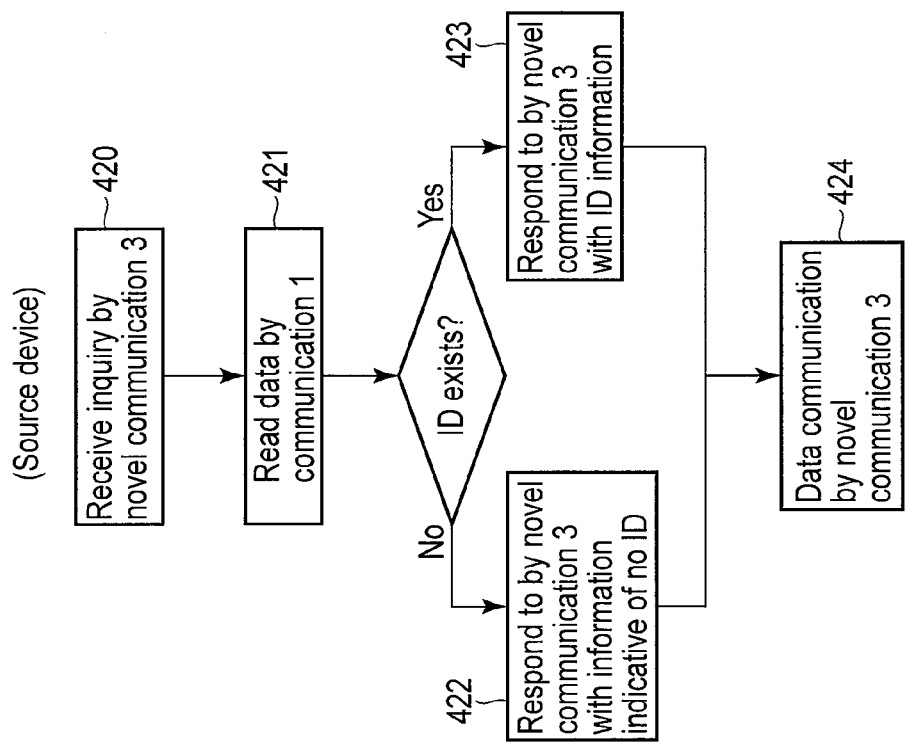

FIG. 9 is a flowchart showing operation of making an inquiry from the sink device to the source device and a response thereto.

(B) Sink Side

504: An inquiry is made about cable ID information to the source device by the novel communication 3.

(A) Source Side

420: The inquiry made in 504 is received by the novel communication 3. Hence, the source device can determine that the sink device in the partner side is a novel device, and that transmission/reception of data by the novel communication 3 and AV data transmission by HDMI-2 are available.

421: A cable ID is read by communication made by the communication 1 in the microcomputer 105 of the source device 101.

422: There is no ID information of the cable. A response is made to the sink device by the communication-3 unit 112, adding information indicating no ID to a signal.

423: ID information of the cable exists. A response is made to the sink device by the communication-3 unit 112, adding the ID information to a signal.

424: Data transmission/reception is performed by the novel communication 3. The HDMI-2 transmission unit is selected, and transmission of AV data is enabled.

(B) Sink Side

506: A response including the cable ID has been received. Data communication is made by the novel communication 3. The HDMI-2 transmission unit is selected, and reception of AV data is enabled.

507: No response has been made. Hence, no cable is determined to be connected and/or communication with the source device is stopped.

As has been described above, according to the present embodiment, there is provided a signal transfer system which allows use of a novel cable including a multi-core cable comprising signal lines each having a single signal-transfer direction, and improves in compatibility with conventional devices.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A transmitter configured to communicate with a receiver and transmit video/audio data to the receiver, the transmitter comprising:
   an AV transmission unit comprising a first transmission unit which transmits video/audio data according to a first method, and a second transmission unit which transmits video/audio data according to a second method, with a clock signal inserted in a data signal;
   a communication unit configured to communicate with the receiver by a first standard signal;
   a communication channel switch unit configured to transfer a video clock signal to a clock terminal of an HDMI when the video/audio data is transmitted by the first transmission unit, and to transfer a second standard signal output from the communication unit to the clock terminal when the video/audio data is transmitted by the second transmission unit, while the communication channel switch unit transfers a third standard signal received by an HPD/RSV terminal of the HDMI to the communication unit even during transmission by any of the first and second transmission units; and
   a controller configured to control the AV transmission unit and the communication channel switch unit.

2. The transmitter of claim 1, wherein the controller comprises a read unit which reads content of a cable ID memory included in a cable which connects the transmitter and the receiver, and read cable ID information is transmitted to the receiver through the communication unit.

3. The transmitter of claim 2, wherein when the controller detects that the cable has a cable ID, the controller selects the second transmission unit, and transfers the video/audio data.

4. The transmitter of claim 2, wherein when the controller cannot detect the cable ID but can receive display performance information of a display which the receiver comprises through a display data channel (DDC) terminal of the HDMI, the controller selects the first transmission unit and transfers the video/audio data.

5. The transmitter of claim 1, wherein the controller switches a communication channel of the communication channel switch unit, depending on a type of the cable which connects the transmitter and the receiver.

6. A receiver configured to communicate with a transmitter and receives video/audio data from the transmitter, the receiver comprising:
   an AV receiving unit comprising a first receiving unit which receives video/audio data according to a first method, and a second receiving unit which receives video/audio data according to a second method with a clock signal inserted in a data signal;
   a communication unit configured to communicate with the transmitter by a first standard signal;
   a communication channel switch unit configured to receive a video clock signal through a clock terminal of an HDMI when the video/audio data is received by the first receiving unit, and to supply a second standard signal received by the clock terminal to the communication unit when the video/audio data is received by the second receiving unit, while the communication channel switch unit supplies a third standard signal output from the communication unit to an HPD/RSV terminal of the HDMI even during reception by any of the first and second receiving units; and
   a controller configured to control the AV receiving unit and the communication channel switch unit.

7. The receiver of claim 6, wherein when a carrier of the first standard signal is input to the clock terminal, the controller selects the second transmission unit and receives the video/audio data.

8. The receiver of claim 6, further comprising: a display performance memory which records display performance of a display which the receiver comprises; and
   a read unit which reads content of the display performance memory, wherein
   read display performance information is transmitted to the transmitter through the communication unit.

9. The receiver of claim 6, wherein
   the controller performs communication with the transmitter through the communication unit to inquire whether the cable has a cable ID or not, and
   when the controller is acknowledged of that the cable has the cable ID, the controller selects the second transmission unit and receives the video/audio data.

10. A communication channel switch method for switching a communication channel in a transmitter comprising an AV transmission unit and a communication unit which is configured to communicate with a receiver by a first standard signal, the AV transmission unit comprising a first transmission unit which transits video/audio data according to a first method and a second transmission unit which transmits video/audio data according to a second method with a clock signal inserted in a data signal, the method comprising:
    transferring a video clock signal to a clock terminal of an HDMI when the video/audio data is transmitted by the first transmission unit;
    transferring a second standard signal output from the communication unit to the clock terminal when the video/audio data is transmitted by the second transmission unit; and
    transferring a third standard signal received by an HPD/RSV terminal of the HDMI even during transmission by any of the first and second transmission units.

11. The method of claim 10, wherein a communication channel is switched, depending on a type of a cable which connects the transmitter and the receiver.

12. The method of claim 11, wherein when the cable is detected to have a cable ID, the video/audio data from the second transmission unit is transferred to a video/audio output terminal.

13. The method of claim 11, wherein when the cable ID cannot be detected but display performance information of a display which the receiver comprises can be received through a display data channel (DDC) terminal of the HDMI, the video/audio data from the first transmission unit is transferred to a video/audio output terminal.

14. A method for switching a communication channel in a receiver comprising an AV receiving unit and a communication unit configured to communicate with a transmitter by a first standard signal, the AV receiving unit comprising a first receiving unit which receives video/audio data according to a first method and a second receiving unit which receives video/audio data according to a second method with a clock signal inserted in a data signal, the method comprising:
    receiving a video clock signal through a clock terminal of an HDMI when the video/audio data is received by the first transmission unit;
    supplying a second standard signal received by the clock terminal to the communication unit when the video/audio data is received by the second receiving unit; and
    supplying a third standard signal output from the communication unit to an HPD/RSV terminal of the HDMI even during reception by any of the first and second transmission units.

* * * * *